Patented Nov. 18, 1952

2,618,624

UNITED STATES PATENT OFFICE 2,618,624

COMPOSITION OF STYRENE AND ISOBUTYLENE POLYMERS

William J. Sparks, Westfield, and Luther B. Turner, Roselle Park, N. J., assignors to Standard Oil Development Company, a corporation of Delaware No Drawing. Application February 15, 1949, Serial No. 76,665

1 Claim. (Cl. 260—45.5)

This application relates to electrical insulating members, relates particularly to insulators composed of polymeric material; and relates especially to homogeneous multi-component mixtures of copolymers of isobutylene and styrene; with polyisobutylene and with polystyrene.

For radio frequency insulators, especially for the ultra high frequencies, it is highly desirable that insulating materials be used which have the lowest possible dielectric losses; but at the same time are of sufficient strength to stay in place, yet somewhat elastic and plastic, and, in addition, are thermoplastic at a comparatively high temperature, and free from brittleness over the entire range of normal ambient temperatures from approximately 100° C. down to —50 or —60° C. Of all of the available insulating materials, high molecular weight polystyrene and polyisobutylene, e. g., at least 50,000 mol. wt., are about the only easily assembled ones which have satisfactorily low dielectric loss characteristics. However, polystyrene is brittle over the entire ambient temperature range and polyisobutylene shows the property of cold flow and low physical strength over the entire ambient temperature range. Hence neither material is satisfactory for electrical insulation. Attempts have been made to mix the two materials but they are mutually insoluble and incompatible; a mixture of the two yields merely a continuous phase of polyisobutylene of low strength, with relatively rapid cold flow, containing a disperse phase of particles of polystyrene.

It has also been found possible to interpolymerize isobutylene and styrene under special circumstances to yield a copolymer having improved properties. However, this copolymer cannot be prepared in the most desirable form; since if it contains enough isobutylene to be free from brittleness over the entire range of ambient temperature, it shows the property of cold flow; whereas if it contains enough styrene to be free from cold flow, it is undesirably brittle.

The present invention is based upon the discovery that both simple polyisobutylene having a Staudinger mol. wt. above 50,000 and simple polystyrene of similar high molecular weight are soluble in and compatible in certain proportions with the certain type of copolymer of isobutylene and styrene which will be described later, and they serve to modify the properties of the resulting material in a very advantageous manner. That is, they yield a three component mixture by the adjustment of which highly advantageous properties otherwise unobtainable, may be secured. That is, the proportions of isobutylene and styrene in the copolymer may be adjusted to yield a material which, when mixed with polystyrene, is free from brittleness; which mixture when containing polyisobutylene in addition, is of good strength over the entire ambient temperature range, thermoplastic at a desirably high temperature, and free from brittleness over the entire ambient temperature range.

Thus, the three component mixture of polystyrene, polyisobutylene and the copolymer of styrene and isobutylene yields the new and unexpected property of complete intersolubility over a range of component proportions, sufficiently wide to permit of the production of mixtures having highly desirable properties. Other objects and details of the invention will be apparent from the following description.

The copolymer component of the invention is prepared by a special procedure coming within the broad disclosures of Patent 2,274,749. The process for the preparation of these copolymers consists in the preparation of mixtures of liquid isobutylene and styrene or equivalent materials and the interpolymerization thereof at temperatures ranging from below —50° C. down to about —100° C., preferably at least below —70° C., by the application thereto of a Friedel-Crafts catalyst which is preferably aluminum chloride in solution in a low-freezing non-complex-forming solvent such as ethyl or methyl chloride or carbon disulfide. Substantially any of the Friedel-Crafts catalysts disclosed by N. O. Calloway in his article on "The Friedel-Crafts Synthesis" printed in the issue of "Chemical Reviews" published for the American Chemical Society at Baltimore in 1935 in volume XVII No. 3, the article beginning on page 327, the list being particularly well shown on page 375, may be used; preferably in solution, although several kinds usable in liquid or gaseous form. When the catalysts are used in solution, such solvents as carbon disulfide and its homologues and analogues or any of the mono or poly alkyl halides having freezing points below about 0° C., being thereby "low-freezing," are usable; a characteristic of these alkyl halides and carbon disulfide and its analogues and homologues being the freedom from any tendency to form complexes with the Friedel-Crafts catalyst substances. In the preparation of the copolymer, the mixture of isobutylene and styrene may contain either component in the proportion between 35% and 65% by weight, although the preferred ratio is 50 to 60% of the styrene or other polymerizable mono-olefinic hydrocarbon containing an aromatic nucleus. Its intrinsic viscosity, e. g. in toluene, should be at least 0.6, corresponding to a mol. wt. of at least 50,000, and may be up to 200,000.

The polymerization is conveniently obtained by cooling the mixed isobutylene-styrene material to the desired temperature and adding thereto the desired polymerization catalyst, which, if a solution or a liquid, is desirably sprayed onto the surface of the rapidly stirred cold olefinic material, or may be added in the form of a jet into a zone of high turbulence in the olefinic material, or by any other means which secures a rapid and thorough dispersion of the catalyst into the cold olefinic mixture. The polymerization proceeds rapidly to yield the desired solid polymer which is then brought up to room temperature and purified as desired.

In the preparation of the polyisobutylene component of the mixture, the polyisobutylene is conveniently cooled at a temperature below −50° C., usually preferably below −70° C. and the temperature may be as low as −100° C. or even as low as −164° C., and then polymerized by the application of a Friedel-Crafts catalyst as above-indicated, preferably in solution, as pointed out. In this instance also the polymerization proceeds quickly to yield the desired high molecular weight polymer which likewise is brought up to temperature and purified in any convenient way.

It may be noted that the molecular weight of the polyisobutylene may be varied by the choice of catalyst, by the choice of polymerization temperature and by the type of catalyst used, aluminum chloride in solution in an alkyl halide yielding a higher molecular weight than does gaseous boron trifluoride. It may also be noted that the molecular weight of the polyisobutylene used has a substantial effect upon the character of the polymeric mixture obtained, and should be between 50,000 and 200,000, and preferably between 80,000 and 150,000.

The polystyrene may be prepared by any one of several procedures; for instance, the pure liquid styrene may be cooled to a temperature ranging from below −50° C., preferably below −70° C. to −100° C. or lower, and polymerized by a Friedel-Crafts catalyst, as above-pointed out, preferably in solution, as disclosed; the polymerization reaction proceeding rapidly to yield a highly satisfactory solid polystyrene; alternatively, the styrene may be polymerized by prolonged standing at room temperature; or it may be polymerized by the application of peroxide catalysts at room temperature, or at slightly elevated temperatures.

For this polymerization, the polystyrene is desirably prepared in pure form by means well-known to those skilled in the art. In particular, it is highly desirable that the styrene monomer and the polymerization reaction medium be as free as possible from high boiling or polymerizable substances which have poor electrical properties. It is also desirable that the finished material be free from highly soluble or low molecular weight impurities which modify the electrical properties. However, these latter substances may be removed from the finished polymer by hot milling and washing with alcohol, or washing in finely divided form. The best method for preparing highly pure polymers, however, consists in the dissolving of the several polymers in convenient solvents which for the various polyisobutylenes may be low boiling petroleum hydrocarbons and for the other polymers may be mixtures of low boiling petroleum hydrocarbons with aromatics such as benzol or toluol or the chlorinated hydrocarbons and a precipitating of the polymer from solution by the addition of small amounts of oxygenated compounds such as the various alcohols.

In the preparation of the polymeric mixture of the present invention, the copolymer of styrene and isobutylene is desirably present in the mixture in a weight proportion ranging from 40% to 70%, preferably 50% to 60%. The simple polyisobutylene component of the mixture is desirably present in the proportion of from 10% to 40%, preferably 15 to 30%, and the simple polystyrene component of the mixture is preferably present in the proportion of from 20% to 50%, preferably 25–40%, of the mixture.

It may be noted that the molecular weights of the several polymers are of substantial importance. The molecular weight of the polyisobutylene is the most important and the appropriate range is from about 50,000 up to the maximum obtainable which at present is on the order of 500,000, preferably about 80,000 to 200,000. Polyisobutylene material having lower molecular weights such as between 10,000 and 20,000 has an undesirable softening effect due to the semi-oily polymer. The molecular weight of the polystyrene is of much less importance since the characteristics of the polystyrene show a much less change with change in molecular weight than do the characteristics of polyisobutylene. However, a molecular weight for the polystyrene should be about 50,000 to 200,000, preferably 80,000 to 120,000. For the copolymer of isobutylene and styrene, the importance of the molecular weight is intermediate, but varies slightly with the amount of isobutylene copolymerizate; the molecular weight should generally be about 50,000 to 200,000, and preferably 60,000 to 150,000.

That is, the best proportions of materials are substantially influenced by the molecular weights of the materials and the obtainable characteristics of the material are substantially influenced by the molecular weights of the several components. Low molecular weights on all of the components tend to yield a material of lower strength while maximum molecular weights of all of the materials tend to make a stiffer, tougher, stronger material having a higher melting point.

*Example 1*

A copolymer of isobutylene and styrene was prepared by mixing 100 parts by weight of styrene, 100 parts by weight of isobutylene, 400 parts by weight of methyl chloride in a suitable reactor which was jacketed with liquid ethylene. When the mixture had reached a temperature of approximately −100° C., a catalyst consisting of approximately 20 parts by weight of a solution of methyl chloride containing 0.4% of aluminum chloride was added to the olefinic material. The reaction proceeded promptly to produce a copolymer of isobutylene and styrene containing equal parts of the two olefins, in 100 percent yield, and having a mol. wt. well over 50,000. The polymerization mixture was then dumped into warm water to volatilize the methyl chloride and to wash out the catalyst as well as to bring the temperature of the copolymer to room temperature.

Simultaneously, a simple polyisobutylene was prepared having a molecular weight of approximately 100,000 (as determined by the Staudinger viscosity method), utilizing the procedure above indicated; and a portion of simple polystyrene was prepared by allowing the purified styrene monomer to stand for several days at approximately room temperature to yield a polystyrene having a molecular weight of about 80,000.

The three materials were then mixed in the proportion of 60 parts by weight of the copolymer, as above prepared, with 30 parts by weight of the polystyrene, as above prepared and 20 parts by weight of the polyisobutylene as above prepared. The mixture was made by putting the polystyrene on a hot two-roll mill, working it until a band of hot, plastic polystyrene was obtained around the front roll, with an active working "bank" of polystyrene in the bite of the rolls. To this bank the copolymer was then added slowly in small portions, continuing the milling until a homogeneous material was obtained. The mill was then cooled to a temperature of approximately 70° C. and the simple polyisobutylene added, likewise in successive comparatively small portions, and the milling on the warm mill was continued until the three component mixture was fully homogeneous. The material was then sheeted out on the mill and removed.

This material is a good, fairly hard, slightly flexible, slightly elastic, leathery material, thermoplastic at approximately 150° C., readily milled, calendered, extruded, applied to fabric and otherwise treated.

Electrical tests at 23° C. by the application to the material of alternating current at a frequency of 47.9 megacycles showed a power factor in the material of 0.00045; a dielectric constant (E') of 2.42, and a loss factor (E'') of 0.00110. In addition, the insulation resistance is practically indefinitely high, being too high to be measured with a "Megger" and the breakdown voltage is desirably high, being in the order of 600 volts per mil.

The softening point at which the material could be milled conveniently was found to be about 170° C. The low temperature flexibility of the material was determined by first extruding the composition into a rod of approximately ⅜" diameter by the use of a heated Royle extruder. The rod was then immersed for 30 minutes in a bath of Dry Ice and alcohol (solid carbon dioxide-propyl alcohol) at —20° F. At this temperature of —20° F. the ⅜" diameter rod could be bent sharply through 180° without breaking. The hot flow properties of the material were measured upon a sample ⅞" in diameter by .2" thick. This sample was put under pressure by the application thereto of a ⅝" diameter pressure rod having a weight of one pound. The sample was heated to a temperature of 85° C. for 10 minutes, then put under the pressure rod which was attached to a Randall-Stickney gauge and the weight allowed to act for ten minutes, the amount of compression of the hot sample being measured by the gauge. The movement of the gauge was approximately 3.6% of the thickness of the sample. This is a very advantageously low value for plasticity at 85° C.

The resulting composition of matter is soluble in hydrocarbons generally, both high boiling and low boiling; the material is wholly insoluble in water, does not absorb water at all, and is in fact water-repellent at the surface. The material likewise is wholly insoluble in spirits generally, including all of the alcohols, all of the ethers and all of the esters. It is wholly insoluble in acid or alkali of any sort. The thermal conductivity of the material is sufficiently low to minimize the tendency toward dew formation upon the surface, and the water-repellent character of the surface together with the low dew formation tendencies avoids the formation of a conductive film upon the surface of an electrical insulator even under the most difficult conditions of fogging or dew-forming tendencies. The material has a high tensile strength, depending upon the percentage composition of the materials, but ranging from 1,000 lbs. per sq. inch upward to several thousand pounds per sq. inch. The crushing strength of the material at 23° C. is good, again being above 1,000 lbs. per sq. in. The resistance to vibration is also good, the material showing no tendency toward crystallization under vibration and no tendency to break. The material is thermoplastic and readily formed by molding at an elevated temperature. Also, the material can be machined by appropriate cutting tools and its machinability is nearly as good as that of pure polystyrene.

Higher molecular weight polymer materials show somewhat improved properties at the higher temperatures. This is well brought out in the following example.

*Example 2*

A similar copolymer of isobutylene and styrene was prepared with 50 parts by weight of styrene and 50 parts by weight of isobutylene. This olefinic mixture was copolymerized, as above-described in Example 1. Simultaneously, a simple polystyrene was prepared, as in Example 1, having a molecular weight of 130,000 and a simple polyisobutylene having a molecular weight of approximately 200,000 was prepared as in Example 1. These materials were mixed in the proportion of 60 parts of the copolymer, 30 parts of the polystyrene, and 20 parts of the polyisobutylene. The proportions in this example are substantially the same as those in Example 1 but the molecular weights of the several materials are considerably higher. Because of the higher molecular weights, the material showed a 0% flow at 120° C., thereby being much harder than the composition of Example 1, and the material was still flexible, as shown by the test of Example 1 at —20° F.

*Example 3*

Two copolymers of isobutylene and styrene were prepared, one from a mixture of 50 parts by weight of styrene with 50 parts by weight of isobutylene, and the other with 60 parts by weight of styrene and 40 parts by weight of isobutylene. The molecular weights of both copolymers were in the neighborhood of 100,000 and both were mixed in the ratio of 60 parts of the copolymer, 30 parts of simple polystyrene having a molecular weight of approximately 130,000, and 20 parts by weight of polyisobutylene having a molecular weight of approximately 200,000. Upon determination of the flow properties at 85° C., the mixture prepared from the copolymer containing 50 parts of styrene to 50 parts of isobutylene showed a flow of 13% at 85° C.; whereas polymer prepared from 60 parts of styrene with 40 parts of isobutylene showed a flow of only 7% at 85° C., thereby showing the substantial control of physical properties by modification of the proportions in which the copolymer components are mixed.

This variation can be carried much further than is shown herein but these examples indicate the character of modification obtainable.

The polymer mixture may be used as such where the utmost in the electrical properties is desired, but its properties can be still further modified by the incorporation of a variety of filler substances. Amounts of fillers ranging from 1% to 40% or 50% may be incorporated into the composition, and if the pigments are inert and good insulators, relatively little reduction in the electrical properties occurs. Particularly advantageous for this purpose are such fillers as talc or whiting or barites or lithopone. These fillers serve to increase the hardness and stiffness of the polymer mixture without increasing its brittleness. For some uses where the electrical properties are not important such fillers as zinc oxide or lead sulfate or lead chromate or carbon black or wood flour or cotton linters or similar substances may be used. The polymer mixture is compatible with rubber and forms a solid solution therewith and the rubber may be compounded with sulfur and a curing agent before compounding with the polymers, and then cured in the compound. This procedure yields a material of substantially increased elasticity without any substantial increase in brittleness, and in addition, it becomes to a large extent thermosetting, and after having been cured, is no longer thermoplastic, depending upon the amount of rubber incorporated. The preferred range of rubber is from about 1% to about 20% of the mixture and at the bottom range the thermoplastic properties are modified but not entirely destroyed, whereas, as the amount of rubber increases, the thermoplastic properties are progressively reduced. The polymer mixture is similarly compatible with the synthetic rubbers, including the polybutadiene series, known as "Buna" including the copolymers with 20 to 40% of styrene or acrylonitrile; the isobutylene-diolefin low temperature low-unsaturation interpolymer identified as "Butyl," the polychloroprenes, the polymer known as "Thiokol" obtained from ethyl chloride and sodium sulfide; factice and the like.

The polymer, either in the pure form or compounded with the above-mentioned ingredients or analogous ingredients, is suitable for a wide range of structural purposes. Its greatest value is as an electrical insulator and it may be used as a covering for wire or as a structural element for the support of coils or other electrical items. It is particularly advantageous for use in ultra-high-frequency radio apparatus, including such items as wire coverings, tube bases, sockets, coil forms, condenser mountings, and in fact, all those structural elements which are in the high-frequency electrostatic or electromagnetic field. That is, the whole of a short-wave radio set may be constructed of copper or silver wire and the present polymer, thereby obtaining a very substantial improvement in electrical output and electrical properties generally. In the preparation of wires insulated with the material, it may be extruded around the copper wire in the manner in which a rubber insulation is applied to wire, or it may be dissolved in a light petroleum solvent with or without benzol, as desired, and a coating applied to the wire by dipping or spraying or other means as desired, and the solvent evaporated to leave a wire which is insulated by a thin coating which has some points of similarity to prior enameled wire. Alternatively, the wire may be coated by either method, giving a braiding of fiber such as cotton, silk, rayon, nylon or the like, and then another layer of polymer applied, either by extruding or from solution as before.

The material is particularly good for an insulator in a concentric cable which may be prepared by extruding onto a solid center wire a substantial layer of the polymer which is then covered with the second tubular conductor applied as a spiral strip wound upon the insulated center wire or as a braiding of fine wires, or as a strip, applied lengthwise of the conductor and closed with a longitudinal seam; or a series of disc-like insulators may be applied to the center wire and the outer, concentric conductor applied as a tube or a rolled strip with a longitudinal seam or otherwise, as desired. The material is particularly good for submarine cable generally, because of its especially high insulation resistance and good electrical properties. The low dielectric losses permit of the construction of a highly efficient voice frequency cable in which a substantial reduction of loading is obtainable, either by a wider spacing of loading coils, or by a lighter, smaller, Permalloy wrapping. It is usable for electrical wire in general at any voltage. It is particularly good for the insulation of coils, either as a thin coating or as an impregnating medium applied from a heavy solution in petroleum hydrocarbons.

It is highly useful for molding purposes generally, both electrical parts and ornamental objects, and in fact any molded solid structure. It is particularly advantageous for composite objects where a hard portion and a soft portion are desired in an integral structure. Thus, it is particularly advantageous for bottle closures generally, since a portion which comes against the bottle neck can be made of a relatively elastic type to conform to the bottle shape and another portion is made of relatively hard, stiff compound to give the necessary strength to the closure. That is, for Mason jar covers, the lower end may consist of a ring of compound according to the invention which is relatively high in polyisobutylene and is prepared with a copolymer which also is relatively high in isobutylene; the balance of the cover being made of material relatively high in styrene to provide the necessary strength.

Thus, the composition of the invention provides a new and useful compound having particularly good electrical values at ultra high radio frequencies and at the same time good physical properties, which is convenient to form and shape and convenient to apply to electric purposes; and in addition the material is particularly advantageous for the preparation of unitary integral structures having different physical properties in different portions of the same integral structure.

This application is a continuation-in-part of application Ser. No. 504,724 filed October 2, 1943.

While there are above-disclosed but a limited number of embodiments of the composition of the invention, it is possible to produce still other embodiments without departing from the inventive concept herein disclosed and it is therefore desired that only such limitations be imposed on the appended claim as are stated therein or required by the prior art.

We claim:

Composition consisting essentially of about 27.3% by weight of polystyrene having a Staudinger molecular weight of about 80,000 to 130,000, about 18.2% by weight of polyisobutene having a Staudinger molecular weight of about 100,000, and about 54.5% by weight of a styrene-isobutylene copolymer having about 50% by weight of combined styrene and having a Staudinger molecular weight of about 100,000, said composition being substantially homogeneous and having a flow of less than 5% at 85° C.

WILLIAM J. SPARKS.
LUTHER B. TURNER.

REFERENCES CITED

The following references are of record in the file of this patent:

UNITED STATES PATENTS

| Number | Name | Date |
|---|---|---|
| 2,051,944 | Hershberger | Aug. 25, 1936 |
| 2,213,423 | Wiezevich | Sept. 3, 1940 |
| 2,247,154 | Geiger et al. | June 24, 1941 |
| 2,263,213 | Johnston | Nov. 18, 1941 |
| 2,274,749 | Smyers | Mar. 3, 1942 |
| 2,282,002 | Scott et al. | May 5, 1942 |

FOREIGN PATENTS

| Number | Country | Date |
|---|---|---|
| 513,521 | Great Britain | Oct. 16, 1939 |
| 586,466 | Great Britain | Mar. 19, 1947 |

OTHER REFERENCES

Meyer, "Natural & Synthetic High Polymers," page 115, pub. 1942 by Interscience Publishers, N. Y.